Oct. 15, 1935.                    M. FALDINI                    2,017,398
                         MANUFACTURE OF POROUS RUBBER
                             Filed Sept. 19, 1933
Fig.1.                                              Fig.2.
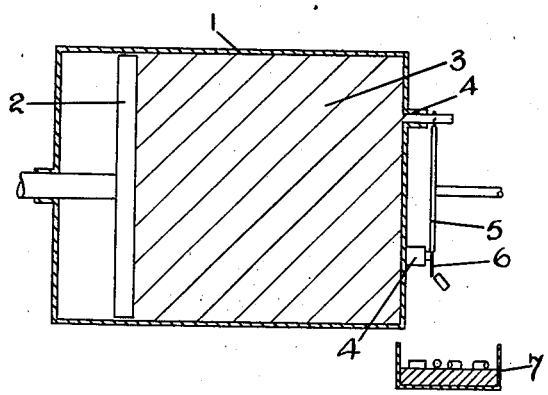                                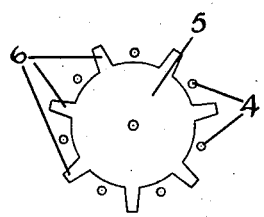
Fig.3.              Fig.4.
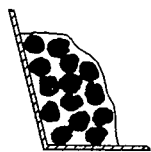        
                                              INVENTOR:
                                              Mario Faldini,
                                      By:-Smith, Michael and Gardiner,
                                                        Attorneys.

UNITED STATES PATENT OFFICE 2,017,398

MANUFACTURE OF POROUS RUBBER

Mario Faldini, Milan, Italy, assignor to Società Italiana Pirelli, Milan, Italy

Application September 19, 1933, Serial No. 690,163
In Italy September 20, 1932

30 Claims. (Cl. 18—53)

This invention relates to the manufacture of sponge rubber and articles, more specially moulded articles, composed thereof. By the term "sponge rubber" is meant for the purposes of this specification porous vulcanized rubber, in which, as in natural sponge, the pores or cells are inter-communicating.

It is usual in the manufacture of sponge rubber and articles composed thereof, to produce the porous condition of the final rubber by adding to the parent mix a material which is capable upon rise of temperature in the mix during vulcanization thereof, of evolving gases in situ which cause the vulcanizing mass to swell and to become, upon completion of vulcanization, a permanently porous mass.

This method of producing sponge rubber is quite satisfactory for the manufacture of cakes and the like of a sponge rubber of more or less plain or regular shape. For the production, however, of complicated or highly shaped moulded articles, the said method tends to be unsatisfactory owing to the relatively high viscosity of a mix of pre-coagulated rubber, and it is preferable for this reason to produce the article directly from an aqueous rubber dispersion, as a dispersion more readily distributes itself in a uniform manner throughout the mould or former, that is to say into the remote or awkward and inaccessible corners and recesses thereof, than a mix of pre-coagulated rubber.

The object of the present invention is to provide an improved process for the production of sponge rubber and articles composed thereof, more especially moulded articles, and in particular to provide a process which will be capable of ready application to the moulding of complicated or highly shaped moulded goods.

According to the present invention, a process for the manufacture of sponge rubber or articles, more especially moulded articles, composed thereof, is characterized by coagulating an aqueous rubber dispersion in the presence, in distribution through the mass of dispersion, of temporary pore-forming cores consisting of beads, grains, fragments or the like of a substance or substances which is (or are) substantially chemically inert towards the dispersion, with the exception of the heat destabilizing and coagulating action hereinafter referred to, and is (or are) capable, while the beads or the like are in distribution through the dispersion, of remaining solid at normal temperatures and is (or are) soluble or colloidally dispersible by action of hot water or prolonged action of cold water upon it (or them), and thereafter extracting the said cores so as to leave a porous product.

The beads or the like of core material may be composed of any convenient substance having the characteristics specified above. Preferred substances for the purpose are reversible colloids, such as glue, gum arabic, agar-agar, gelatine, gum tragacanth, dextrine and the like; also molasses and other sugar substances; or in conjunction with an inert filler as hereinafter described a product of partial hydrolysis of starch or cellulose such as that obtained from the residues of bleaching of cellulose and frequently used in foundry work as a binder of the sands employed in the manufacture of mould cores.

The foregoing specific colloids are readily obtainable in the shape of beads, grains or other suitable divided form for the purposes of this invention and they are easily dissolved or dispersed by treatment with water, particularly water at a raised temperature.

If desired, the core beads, grains or the like may be composed partly of a reversible colloid such as one or other of the particular colloids mentioned above, and partly of an inert pulverulent material such for example as calcium carbonate, powdered talc, kaolin and the like or their mixtures, the pulverulent substance being incorporated with the colloid and the two substances being extracted together upon the application of the hot water to the coagulum.

The process is applicable both to the case where a vulcanized rubber dispersion is employed and also to the case where an unvulcanized dispersion is used, and in the latter case the core extraction and vulcanizing operations may take place contemporaneously, the heat of the hot water used for the extraction of the core serving at the same time to effect vulcanization of the rubber.

It is to be understood, however, that the invention is not limited to this procedure, and includes within its scope the procedure of vulcanizing after the step of extracting the core from the coagulum.

It is further to be understood that the term "rubber", as used in this specification, includes, in addition to rubber in the ordinary sense of this term, other substances similar to rubber, for example, gutta percha, balata and the like. Again the invention includes the use, not only of natural dispersions or latices of rubber, gutta percha or the like, but also artificial dispersions of these and similar substances, particularly reclaimed rubber. Furthermore, the dispersions may either be of normal rubber content or in the form of concentrates.

The parent dispersion for the purposes of this invention may incorporate any of the usual rubber addenda, for example, vulcanizing agents, accelerators, anti-oxydants, minerals or other softeners, which ingredients perform, of course their usual functions during the process and in the finished rubber.

The dispersion may also contain heat-destabilizing agents, for example salts of bivalent metals such as magnesium sulphate or calcium sulphate for instance or ammonium salts employed in conjunction with zinc oxide, or again di-substituted aromatic guanidines, with a view to accelerating and controlling the coagulation of the dispersion upon the application of heat thereto.

By "heat-destabilizing agents" in the sense in which this expression is used herein is meant agents, such for example as salts of bivalent metals such as magnesium sulphate or calcium sulphate or ammonium salts employed in conjunction with zinc oxide or di-substituted aromatic guanidines, which while remaining inactive as destabilizing or coagulating media in aqueous rubber dispersions so long as the temperature of the dispersion is maintained at or about normal temperature are capable of assuming activity in the dispersion to destabilize or coagulate the latter upon rise of temperature therein, the dispersion thus coagulating with retention of more or less of its component water.

As will be appreciated, the grains, beads or the like of core material are selected as to their size and form with respect to the desired dimensions and shape of the pores to be produced in the finished rubber, these pores approximately coinciding in form and size with the beads or the like of core material which are introduced into the parent dispersion.

In this connection it is to be remarked that the sponge rubber products of the process of this invention are characterized, as distinguished from sponge rubber products obtained as hitherto by the introduction into the parent rubber dispersion or the development in situ therein of bubbles of gas or vapour, by the fact that whereas the cells of the products obtained by these known processes are separated from one another by contiguous walls which are very thin and are of substantially uniform thickness all over, the cells of the sponge rubber products obtained by the process of the present invention are separated from one another by walls which are comparatively thick as compared with the cell walls of the known products referred to and which are moreover of quite irregular thickness as illustrated more or less diagrammatically in the accompanying drawing.

It may further be remarked in the foregoing connection that it has been proposed to incorporate fragments of soluble material into a vulcanizable rubber mixing (that is to say into a mixing of pre-coagulated rubber), vulcanizing the resulting mixture and washing out the fragments of soluble material. The present invention, however, is essentially distinguished from this prior proposal and from others similar to it but involving the use of solutions of rubber, in that in the process of the present invention, a dispersion is employed such as latex, it having been found that surprisingly superior results are obtainable with dispersions, owing principally to the very low viscosity characteristic of dispersions as compared with solutions and mixings of preformed rubber softened for incorporation with the fragments of pore-forming material. A dispersion will readily envelop completely the individual beads or the like of pore-forming material and during coagulation will set exactly to the shape of these beads, with the result that the internal pore structure of the finished sponge rubber is very closely predeterminable, and by appropriate selection of the pore-forming material, as to shape and size thereof, practically any desired structure can readily be obtained. Moreover, a rubber dispersion will more readily penetrate the smaller and more remote recesses of the mould and for this reason will give a more perfectly moulded article.

The process of this invention is especially advantageous in cases where the parent mix is composed of pre-vulcanized rubber dispersion or is of the rapidly curing type, for in such cases, it is possible, with considerable manufacturing economy, to use moulds composed of plaster of Paris, wood or a like relatively inexpensive material that may be incapable of withstanding the high temperatures normally employed in vulcanizing operations, the curing operation, in the case of use of a mix of the rapidly curing type, being performed for example in the drying oven in which the washed core-freed coagulum is afterwards dried and therefore at a temperature considerably below usual vulcanizing temperatures.

The invention may be carried into effect in a variety of ways. The aqueous rubber dispersion may be intimately mixed together with the core material and the paste so obtained poured into a shaping mould and coagulated therein, for example by any of the known methods.

Alternatively, however, and in general preferably, the core material is placed in the shaping mould first and the aqueous rubber dispersion is poured on to it. Thus, it is found that in following this procedure, the dispersion readily gains access to the spaces between the individual beads or grains of core material and fills these spaces; in other words, that it is unnecessary to mix the dispersion and core material together into the form of a paste before admitting them into the mould. The result is that the process if carried out in this manner is rendered somewhat more rapid and economical, especially when performed on a commercial scale, as compared with when the materials are first pasted together before introduction.

According to a feature of the invention, the core material which is distributed through the mass of dispersion may contain a coagulant for the dispersion so carried in or upon the core material as to be readily releasable therefrom into the surrounding dispersion in the mould for diffusion therethrough with consequent coagulation of the mass, for example at normal temperature or a slightly raised temperature, for instance 60–70° C.

In this connection, it may be remarked that the preferred procedure just referred to, of placing the core material in the mould first and simply pouring the dispersion on to it, is rendered possible by the use in accordance with the present invention of a dispersion of rubber, in contrast to a solution or a mixing of softened pre-formed rubber, on account of the relatively low viscosity of dispersions as compared with solutions and softened rubber mixings, which require for their incorporation with subdivided core material mechanical intermixing therewith.

Generally speaking, any of the usual rubber coagulants may be employed when carrying the invention into effect in this manner, that is to say provided they are sufficiently water soluble and are non-reactive under the conditions of the process with the core material. Preferably, however, the agent employed is a heat-destabilizing agent or dormant coagulant, i. e. a substance which does not coagulate at ordinary temperature but causes the dispersion to coagulate by a raise of temperature e. g. above 70° C. Preferably such an agent is a salt of a bivalent metal, for example one or other of the specific bivalent metal salts mentioned above. A particularly suitable substance is calcium sulphate.

An important advantage accruing from the foregoing feature of the invention, of incorporating the coagulant for the dispersion in the beads, grains or the like of core material, is that there is less tendency for the dispersion prematurely to coagulate, that is to say before introduction into the shaping mould, in the event of it not being utilized within the usual short time after its operation. This is due of course to the fact that the dispersion remains free from the presence and action of coagulants until it is actually introduced into the mould and makes contact with the core material.

When a very strong coagulating action is required, e. g. when operating with dilute dispersions, the heat-destabilizing or coagulating agent or agents may be introduced both in the dispersion and in the core material.

The grains, beads or the like of the core material may be formed entirely of heat-destabilizing agent (e. g. calcium sulphate) agglomerated by a binding agent like the colloids above mentioned. Or it may be composed by a mixture of one or more inert materials (e. g. whiting or kaolin) with a suitable proportion of a heat-destabilizing or coagulant agent (e. g. magnesium sulphate) held together by a binding material as above. Or finally grains or beads or the like of inert material may be superficially coated with a heat-destabilizing or coagulant agent, e. g. spraying on them a concentrated solution of magnesium sulphate or the like.

According to a further feature of the invention, in that form of the process in which an unvulcanized dispersion is employed, vulcanization and coagulation of the dispersion may be caused to take place in a single operation, coagulation occurring simultaneously with or shortly before vulcanization. This method of operation is more especially applicable in the case of dispersions of normal or diluted rubber content. It is also applicable, however, to concentrated latex and like dispersions.

Operating in this manner, the mass of dispersion and core material in the mould is brought directly to the appropriate temperature for vulcanization, without waiting for coagulation first to take place in the cold or at the usual comparatively slightly raised temperature. As will be understood, the higher temperature to which, according to this mode of procedure, the dispersion is directly brought for the effectuation of vulcanization, strongly accelerates the coagulation of the mass, which latter coagulates and vulcanizes contemporaneously or vulcanizes almost immediately after coagulating.

An advantage accruing to this procedure, is that the process may be carried into effect with the use of normal or diluted latex mixings without unduly lengthening the cycle of operations. Also, the process is rendered more rapid of effectuation as compared with the alternative procedure, of first coagulating the dispersion at a normal or slightly raised temperature and thereafter effecting vulcanization of the coagulum at the higher temperature requisite for this operation. In this connection, it will be appreciated that the acceleration of the speed of the process results in economy in the necessary number of moulds required for the production in a given time of a given number of moulded articles. Thus a batch of moulds may be filled, emptied and filled again, at shorter intervals. The interval for an article of average size may be as small as forty-five minutes or less.

The porous rubber thus obtained by the use of this invention is very applicable to the manufacture of upholstery parts of sponge rubber, for example, elastic mattresses, also elastic cushions, seats and backs for chairs and the like, upholstery parts for automobiles, railway coaches, aeronautical vehicles and the like.

The beads, grains or other form of core material may be produced by any known or convenient process. The following processes however, may be described by way of example.

(1) 6 kgs. of finely divided kaolin, pasted to a dough with 2 kgs. of a 15% solution of glue, for example in a kneading machine such as the machine used in the macaroni industry, are extruded through an extruding press, and then cut into small cylinders or rods of a length varying from 2–4 mms., the diameter of the cylinders or rods being also from 2-4 mms. The cylindrical rods so produced are collected on a bed of talc, are dried in an oven at a temperature of about 70° C. for two hours and are then sifted. The purpose of the bed of talc is to coat the cut rods with a dust which will prevent the rods from conglomerating together and the final step of sifting the dried rods is to separate the latter from the talc dust and/or from kaolin dust. Any other suitable dust than powdered talc may, of course, be employed.

The accompanying drawing shows, in Figures 1 and 2 and in diagrammatic representation, a form of extrusion machine suitable for use in the production of the cut rods of core material referred to above.

As shown in said Figures 1 and 2, the machine comprises a cylinder 1 in which works a piston 2. The piston forces the dough 3 of kaolin and glue (or the equivalent substances) through an annular series of extrusion nozzles 4 at the right-hand end of the cylinder. The dough issues from these nozzles in the form of small-diameter cords or cylindrical lengths and rotating immediately in front of the nozzles is a circular knife 5 with a number of radial blades 6 projecting from its periphery. The number of these blades and their width, shape and relative positions are such in relation to the number and relative positions of the nozzles 4, that, as the knife continuously rotates, the blades operate to cut off short equal lengths of the cord of core material continuously issuing from the series of extrusion nozzles.

The short rods of core material thus produced drop into a tray 7 containing a reception bed of powdered talc the purpose of which is that already stated.

It will be appreciated that the foregoing form of extrusion machine is described purely by way of example. Any other type or form of machine suitable for the purpose may be employed.

Also, instead of pasting the ingredients of the core material in a dough machine and extruding the dough as above, a pelleting machine may be employed, operating either in a wet or in a dry condition. In this event, the kaolin and glue (or other core-forming material) is first dried, then granulated and thereafter compressed into pellets.

In further alternative, the mixture of core-forming materials may be dried in bulk, granulated and graded through screens, the smaller particles being again granulated, while the average-size particles are used in the process of making the sponge rubber. By this means, that is to say by granulating and screening, appropriately selecting a grain size, core material of any desired grain size may readily be produced according to the desired pore-size of the sponge rubber to be formed in the general process.

(2) 6 kgs. of finely divided calcium carbonate or whitings are pasted with 2 kgs. of a solution obtained from the residues of bleaching of cellulose at 35–36° Bé., and resulting paste is treated as in process (1) above.

(3) In this process, the core material incorporates the requisite quantity of coagulating agent for the coagulation of the rubber dispersion in the general process of the invention.

6 kgs. calcium carbonate, which owing to its insolubility in water has no effect upon the latex of the rubber mix from which the sponge rubber article is to be produced, and 1 kg. of calcium sulphate are both finely powdered. The powdered material is then carefully pasted together with 2 kgs. of a concentrated solution obtained from residues of cellulose bleaching. The paste so obtained is then extruded and cut into rods, or else pelleted, or again, granulated, by one or other of the above methods of (1).

(4) This process also illustrates the incorporation of the coagulant in the core material, but in this case, the coagulant is only superficially carried in or upon said material.

6 kgs. of calcium carbonate are pasted with 2 kgs. of a concentrated solution obtained from the residues of cellulose bleaching, and the paste so obtained is pelleted or otherwise formed into small pieces as described above. The grains or the like of core material are then thoroughly dried and afterwards superficially sprayed with a concentrated solution of magnesium sulphate. The sprayed material is then again dried.

The invention will now be further described with reference to the following specific examples of the general process. These examples however, are purely illustrative and are not to be regarded as limitative with respect to the scope of the invention.

*Example I*

To 100 grams of unvulcanized latex, concentrated to a 60% dry rubber content, there were added:

| | Grams |
|---|---|
| Sulphur | 12 |
| Zinc oxide | 24 |
| Piperidyl dithiocarbamate of piperidine | 2.5 |
| Calcium sulphate | 5.0 | these four constituents being added in suspension in 40 grams of a 2% solution of gum arabic.

To the mixing thus produced there was added during stirring an equal weight of bead shaped glue of 3 mm. average diameter. The mixture was then poured into a mould, in which it was submitted to a temperature of 60° C. for 30 minutes, at the end of which time coagulation was complete.

Following this, the coagulated mass was removed from the mould and immersed in boiling water for a period of 45 minutes, during which the mass became fully vulcanized and the glue core partially extracted by the action of the boiling water.

Finally, the vulcanized mass was further treated with hot water to complete the extraction of the glue core, after which it was dried. The resulting sponge was then ready for use.

The extracted glue may, of course, be recovered by any suitable means and used again in the manufacture of a further batch of sponge rubber.

*Example II*

1000 grams of pre-vulcanized normal latex having a 33% dry rubber content was admixed with 700 grams of glue in the shape of beads having an average diameter of 2–3 mm. To the paste-like mixture thus produced there were added with stirring 10 ccs. of a 10% aqueous solution of magnesium sulphate and 20 ccs. of a 10% aqueous solution of ammonium sulphate. The resulting mass was poured into a mould and the whole was placed into an oven wherein it was subjected to heating at a temperature of 60° C. This completely coagulated the mix.

The coagulated mass was then removed from the mould and immersed several times in hot water which dissolved out the glue and left the rubber in the desired porous condition. The porous mass was thoroughly washed and dried.

*Example III*

2000 grams of pre-vulcanized latex having a 50% dry rubber content were admixed with 500 grams of an aqueous 50% emulsion of mineral oil and to the resulting mixture there were added 2000 grams of fragments of glue having an average fragment size of 3–4 mm. and 700 grams of similar glue having an average fragment size of about 1 mm.

To the resulting mixture there were then added 5 grams of calcium sulphate suspended in a 10% aqueous solution of gum arabic and after thorough homogenizing the mass was introduced into a mould and coagulated therein by application of heat for 30 minutes at a temperature of 55° C.

A small quantity of water was then introduced into the mould to facilitate the removal of the coagulum therein and the coagulated mass was taken out of the mould and the glue in it extracted by hot water, as in the previous examples.

Finally, the porous mass so obtained was dried in a low temperature drying oven.

*Example IV*

This example illustrates that feature of the present invention, according to which the core material is first placed in the shaping mould and the latex or other dispersion is afterwards poured upon it.

Into a mould, made, for example, of wood and of suitable shape, and having a capacity of about 80 litres, there are first introduced 60 kgs. of small rods or pellets of core material produced as described above in (1). Into the core material so introduced into the mould are then carefully poured 25 kgs. of a rubber dispersion of the following composition:

| | Kilograms |
|---|---|
| Latex concentrated of 50% dry rubber content | 22 |
| Sulphur | 0.250 |
| Zinc oxide | 0.600 |
| Piperidyl dithiocarbamate of piperidine | 0.050 |
| Calcium sulphate | 0.100 |
| 5% solution of gum arabic | 2. |

The dispersion is slowly poured upon the core material in the mould in such a manner that by expelling the air in the spaces between the rods or pellets or core material, it occupies these spaces without voids. The resulting mixtures of dispersion and core material in the mould is then left to stand for one hour at 75° C., by which time coagulation of the mass is complete. The coagulated product is then vulcanized by being heated for about fifteen minutes at a temperature of 127° C. The vulcanized material is then removed from the mould and thoroughly washed in luke-warm water (at a temperature between 50 and 55° C.) to remove the kaolin or other pulverulent constituent of the core material. The washed product is then re-washed in cold water, completely to eliminate the glue and other residue of the core material and leave the rubber mass in the form of a coherent porous product.

Example V 60 kgs. of core material, in the form of rods prepared as described in process (2) above, are placed into a mould of about 80 litres capacity, and on to the rods of core material there are then carefully poured 30 kgs. of pre-vulcanized normal latex of 36% dry-rubber content.

The mass is then coagulated and the extraction of the calcium carbonate and glue of the core material is effected by washing the mass with cold water until all of the carbonate and glue is removed, whereafter the rubber article is dried.

Example VI

Onto a mould of the desired shape of the sponge rubber article to be produced, is poured a pasted mixture of core material, produced in accordance with process (3) above, with a latex mix of the following composition:

|   | Kilograms |
|---|---|
| Latex concentrated of 50% dry rubber content | 22 |
| Sulphur | 0.250 |
| Zinc oxide | 0.600 |
| Piperidyl dithiocarbamate of piperidine | 0.050 |
| 5% solution of gum arabic | 1 |

The mixture thus introduced into the mould is left to stand for a sufficient period of time at room or raised temperature to produce complete coagulation of the rubber dispersion around the grains or the like of core material. The employment of this raised temperature has the effect of accelerating the complete diffusion of the heat destabilizing or coagulant agent from the core material into the surrounding rubber dispersion.

For example the dispersion of the foregoing composition will completely coagulate in about two hours at 60° C. and afterwards vulcanize in about twenty minutes at a temperature of 127° C. The vulcanized article is then removed from the mould and the core material extracted, as in the previous examples, by repeated washings with cold or hot water.

Example VII

A mould of the desired shape of the article to be produced is filled with core material produced according to process (3) or (4) and afterward a latex mix of the same composition as in Example VI is poured upon so as to fill the interstices between the grains of the core material. The filled mould is then heated raising the temperature from room temperature to 127° C. in about five minutes and maintaining it at 127° for about twenty minutes. The mass is thus coagulated and vulcanized in the same step and the object formed is then extracted, the core material being washed out as in previous cases.

Referring again to the accompanying drawing, Figures 3 and 4. illustrate, diagrammatically, the general effect of the process. In Figure 3, there is shown a fragmentary view of a shaping mould filled with bead-like core material and rubber dispersion, the latter occupying without voids the spaces between the beads of core material.

Figure 4 shows, in corresponding fragmentary views, the finished sponge rubber product, that is to say, the coagulated and vulcanized rubber material after the beads of core material have been extracted from it. It will be observed from this latter figure, that the air cells of the sponge, that is to say the spaces which were previously occupied during coagulation and vulcanization of the rubber dispersion inter-communicate with one another after the manner of natural sponge. This is due to the fact that, where the beads of core material are actually touching one another, the dispersion is prevented from being continuous and in consequence, a break is left in the otherwise continuous film or layer of rubber intervening between the adjacent beads of the core.

If, as will usually be the case, the vulcanization step is effected in the shaping mould, the material of the latter should be of a nature such as to stand the raised temperature of vulcanization.

It will further be understood that, as already stated, the details given in the foregoing examples of the invention are illustrative and for purpose of guidance only, and that these details may be departed from within wide limits, for example, in respect of the composition of the rubber dispersion, that of the core material, the duration and temperature of the coagulation and vulcanization operations and the component material of the moulds.

It will be understood of course that in all cases the finished sponge rubber of this invention is composed of rubber in a vulcanized condition and accordingly that, unless otherwise expressly stated, it is implicit in the following claims that either the process includes vulcanization of the coagulum obtained or else a pre-vulcanized disperson is employed as the parent dispersion of the process.

What I claim and desire to secure by Letters Patent of the United States is:

1. A process for the manufacture of sponge rubber or articles, more especially moulded articles, composed thereof, which consists in coagulating an aqueous rubber dispersion in the presence, in distribution through the mass of dispersion, of a temporary pore-forming core material consisting of beads, grains, pellets or fragments of a substance which is capable, while in distribution through the disperson, of remaining solid at normal temperatures and is soluble or colloidally dispersible by action of hot water or prolonged action of cold water upon it, and thereafter extracting the core material so as to leave a porous product.

2. A process as specified in claim 1, wherein the core material is composed of a substance selected from the following: glue, gum arabic, agar-agar, gelatine, gum tragacanth, dextrine, starch; molasses; a colloidal product of partial hydrolysis of starch or cellulose.

3. A process as specified in claim 1, wherein the core material is composed of (a) a substance selected from the following: glue, gum arabic, agar-agar, gelatine, gum tragacanth, dextrine, starch; molasses; a colloidal product of partial hydrolysis of starch or cellulose, and (b) calcium carbonate, powdered talc or kaolin, these two ingredients being incorporated together and extractible together from the rubber coagulum.

4. A process as specified in claim 1, wherein coagulation of the dispersion is effected by means of a substance so carried in or upon the core material as to be readily releasable therefrom into the surrounding dispersion in the mould for diffusion therethrough with consequent coagulation of the mass.

5. A process as specified in claim 1, wherein coagulation of the dispersion is effected by means of a substance so carried in or upon the core material as to be readily releasable therefrom into the surrounding dispersion in the mould for diffusion therethrough with consequent coagulation of the mass at normal or a slightly raised temperature.

6. A process as specified in claim 1, wherein coagulation of the dispersion is effected by means of material carried partly in or upon the core material so as to be readily releasable therefrom into the surrounding dispersion in the mould for diffusion therethrough and partly in the dispersion itself.

7. A process as specified in claim 1, wherein coagulation is effected by means of a heat-destabilizing agent for the dispersion.

8. A process as specified in claim 1, wherein coagulation is effected by means of a heat-destabilizing agent for the dispersion selected from the following: magnesium sulphate or calcium sulphate; an ammonium salt of a strong acid in conjunction with zinc oxide; a di-substituted aromatic guanidine.

9. A process as specified in claim 1, wherein coagulation is effected by means of a heat-destabilizing agent for the dispersion selected from the following: magnesium sulphate or calcium sulphate; an ammonium salt of a strong acid in conjunction with zinc oxide; a di-substituted aromatic guanidine, part at least of the coagulating agent being so carried in or upon the core material as to be readily releasable therefrom into the surrounding dispersion in the mould for diffusion therethrough with consequent coagulation of the mass.

10. A process as specified in claim 1, wherein coagulation is effected by means of a heat-destabilizing agent for the dispersion selected from the following: magnesium sulphate or calcium sulphate; an ammonium salt of a strong acid in conjunction with zinc oxide; a di-substituted aromatic guanidine, part of the coagulating agent being carried in the dispersion and part in or upon the core material so as to be readily releasable therefrom into the surrounding dispersion in the mould.

11. A process as specified in claim 1, wherein the core material is composed of a heat-destabilizing agent for the dispersion incorporated with a colloidal binding agent therefor.

12. A process as specified in claim 1, wherein the core material is composed of a heat-destabilizing agent for the dispersion incorporated with a colloidal binding agent therefor and with calcium carbonate, powdered talc or kaolin extractible from the rubber coagulum along with the colloidal binding agent.

13. A process as specified in claim 1, wherein the core material is composed of a heat-destabilizing agent for the dispersion incorporated with a colloidal binding agent therefor, the said heat-destabilizing agent being selected from the following: magnesium sulphate or calcium sulphate; an ammonium salt of a strong acid in conjunction with zinc oxide; a di-substituted aromatic guanidine.

14. A process as specified in claim 1, wherein the core material is composed of a heat-destabilizing agent for the dispersion incorporated with a colloidal binding agent therefor and with calcium carbonate, powdered talc or kaolin extractible from the rubber coagulum along with the colloidal binding agent, the said heat-destabilizing agent being selected from the following: magnesium sulphate or calcium sulphate; an ammonium salt of a strong acid in conjunction with zinc oxide; a di-substituted aromatic guanidine.

15. A process as specified in claim 1, wherein the core material is composed of (a) a substance selected from the following: glue, gum arabic, agar-agar, gelatine, gum tragacanth, dextrine or starch; molasses; a colloidal product of partial hydrolysis of starch or cellulose, and (b) calcium carbonate, powdered talc or kaolin, these two ingredients being incorporated together and extractible together from the rubber coagulum, and the core material carrying superficially a heat-destabilizing agent for the dispersion.

16. A process as specified in claim 1, wherein the core material is composed of (a) a substance selected from the following: glue, gum arabic, agar-agar, gelatine, gum tragacanth, dextrine or starch; molasses; a colloidal product of partial hydrolysis of starch or celulose and (b) calcium carbonate, powdered talc or kaolin, these two ingredients being incorporated together and extractible together from the rubber coagulum, and the core material carrying superficially a heat-destabilizing agent for the dispersion, which agent is selected from the following: magnesium sulphate or calcium sulphate; an ammonium salt of a strong acid in conjunction with zinc oxide; a di-substituted aromatic guanidine.

17. A process as specified in claim 1, wherein the dispersion employed is an unvulcanized dispersion, and vulcanization of the mass takes place contemporaneously with the extraction of the core material, the heat of the hot water used for this operation serving at the same time to effect vulcanization.

18. A process as specified in claim 1, wherein the dispersion employed is an unvulcanized dispersion, and vulcanization and coagulation are caused to take place in the mass contemporaneously.

19. A process as specified in claim 1, wherein the dispersion employed is an unvulcanized dispersion having a dry-rubber content less than 35% and vulcanization and coagulation are caused to take place in the mass contemporaneously.

20. A process as specified in claim 1, wherein the dispersion employed is a dispersion having a dry-rubber content not substantially exceeding 35% and coagulation is effected by means of a heat-destabilizing agent carried partly in the core material and partly in the dispersion.

21. A process as specified in claim 1, wherein the dispersion employed is a pre-vulcanized dispersion.

22. A process as specified in claim 1, wherein the dispersion employed is a pre-vulcanized dispersion and the mould used is composed of plaster of Paris or wood.

23. A process as specified in claim 1, wherein the dispersion employed is of the rapidly curing type, vulcanization of the mass is effected at relatively low temperature in the mould in which coagulation takes place and the mould is composed of a material such as plaster of Paris or wood which is incapable of withstanding the usual elevated temperatures of vulcanization of rubber mixings.

24. A process as specified in claim 1, wherein the rubber dispersion is first intimately mixed together with the core material and the paste so obtained is poured into the mould for coagulation therein.

25. A process as specified in claim 1, wherein the rubber dispersion is first intimately mixed together with the core material and the paste so obtained is poured into the mould for coagulation therein and the step of coagulation is effected by means of a heat-destabilizing agent for the dispersion selected from the following: magnesium sulphate or calcium sulphate; an ammonium salt of a strong acid in conjunction with zinc oxide; a di-substituted aromatic guanidine.

26. A process as specified in claim 1, wherein the core material is placed in the mould first and the rubber dispersion is poured on to it therein.

27. A process as specified in claim 1, wherein the core material is placed in the mould first, the rubber dispersion being poured on to it therein, and coagulation is effected by a heat-destabilizing agent for the dispersion selected from the following: magnesium sulphate or calcium sulphate; an ammonium salt of a strong acid in conjunction with zinc oxide; a di-substituted aromatic guanidine.

28. A process as specified in claim 1, wherein the core material is composed of a substance selected from the following: glue, gum arabic, agar-agar, gelatine, gum tragacanth, dextrine or starch molasses; a colloidal product of partial hydrolysis of starch or cellulose, and coagulation is effected by means of a heat-stabilizing agent for the dispersion selected from the following: magnesium sulphate or calcium sulphate; an ammonium salt of a strong acid in conjunction with zinc oxide; a di-substituted aromatic guanidine.

29. A process as specified in claim 1, wherein the core material is composed of (a) a substance selected from the following: glue, gum arabic, agar-agar, gelatine, gum tragacanth, dextrine or starch; molasses; a colloidal product or partial hydrolysis of starch or cellulose, and (b) calcium carbonate, powdered talc or kaolin, these two ingredients being incorporated together and extractible together from the rubber coagulum, and coagulation is effected by means of a heat-destabilizing agent for the dispersion selected from the following: magnesium sulphate or calcium sulphate; an ammonium salt of a strong acid in conjunction with zinc oxide; a di-substituted aromatic guanidine.

30. A process as specified in claim 1, wherein the core material is composed of a substance selected from the following: glue, gum arabic, agar-agar, gelatine, gum tragacanth, dextrine or starch; molasses; a colloidal product of partial hydrolysis of starch or cellulose, and coagulation is effected by means of a heat-destabilizing agent for the dispersion carried partly at least in or upon the core material.

MARIO FALDINI.